United States Patent [19]

Tsuchida et al.

[11] Patent Number: 5,577,682
[45] Date of Patent: Nov. 26, 1996

[54] FILM CARTRIDGE HAVING A MOVABLE FLANGE FOR FACILITATING FEEDING OUT AND REWINDING OF FILM

[75] Inventors: Naohiro Tsuchida; Shinya Takahashi, both of Tokyo, Japan

[73] Assignee: Olympus Optical Co., Ltd., Tokyo, Japan

[21] Appl. No.: 184,683

[22] Filed: Jan. 21, 1994

[30] Foreign Application Priority Data

Jan. 22, 1993 [JP] Japan .................................. 5-009282
Jan. 22, 1993 [JP] Japan .................................. 5-009485

[51] Int. Cl.$^6$ .................................................. G03B 23/02
[52] U.S. Cl. .................................... 242/348.3; 242/348.4
[58] Field of Search ............................ 242/348.3, 348.4; 354/275

[56] References Cited

U.S. PATENT DOCUMENTS

| | | | |
|---|---|---|---|
| 4,407,579 | 10/1983 | Huff | 242/348.3 X |
| 4,846,418 | 4/1989 | Fairman | 242/348.3 |
| 5,031,853 | 7/1991 | Jensen | 242/348.3 |
| 5,282,585 | 2/1994 | Takatori | 242/348.3 |

FOREIGN PATENT DOCUMENTS

| | | |
|---|---|---|
| 306844 | 3/1989 | Japan . |
| 3-180838 | of 1991 | Japan . |
| 4-143749 | of 1992 | Japan . |

*Primary Examiner*—John Q. Nguyen
*Attorney, Agent, or Firm*—Louis Weinstein

[57] ABSTRACT

A film patrone which permits a film to be securely delivered from and rewound in the film patrone, and which applies low resistance to the film, thereby decreasing the rewinding load. The film patrone has a case body having shielding properties, a spool rotatably contained in the case body, a film wound in a roll around the spool, a fixed flange integrally formed on the periphery of the spool at at least one end thereof, a movable flange formed in a shape which can freely be fitted to the fixed flange so as to be movable relative to the fixed flange, and a cam unit radially provided on the fixed flange and the movable flange so as to move the movable flange along the direction to thrust the spool.

25 Claims, 4 Drawing Sheets

FILM CARTRIDGE HAVING A MOVABLE FLANGE FOR FACILITATING FEEDING OUT AND REWINDING OF FILM

BACKGROUND OF THE INVENTION

1. Field of the Invention

The present invention relates to a film patrone (i.e. a film cartridge), and more particularly to a film patrone of the type in which a photographic film 35 mm wide contained in the form of a roll therein is delivered by rotation of a spool.

2. Related Art Statement

Various proposals have conventionally been made for a film delivery mechanism of a film patrone in which the leading end of a photographic film is contained.

An example of such proposals is the film delivery mechanism disclosed in Japanese Patent Laid-Open No. 3-180838 in which a photographic film is wound in a roll about a spool, the spool being rotatably contained in the patrone body, the photographic film is delivered to the outside of the patrone body by rotating the spool, and elastic flanges are integrally formed at both ends of the spool, the distance between the flanges being greater than the width of the film on the inner peripheral side and slightly smaller than the width of the film on the outer peripheral side. When the film is wound around the spool until it substantially reaches the outer peripheries of the flanges, the film on the outer peripheral side is elastically held in the narrow portion between the outer peripheries of the flanges. The film is delivered from the patrone body by rotating the spool in the delivery direction.

Japanese Patent Laid-Open No. 4-143749 discloses a film patrone provided with a film delivery mechanism in which a film patrone rotatably containing the film wound around a spool in the patrone body comprises a pair of flanges provided on the spool so as to prevent a slack of the film wound around the spool, and at least one of the flanges is rotated with the spool and can be inclined with respect to the spool to partially form a gap wider than the width of the film between the two flanges. Since one of the flanges is inclined with respect to the spool so that the distance between both flanges is greater than the width of the film on the film entrance side and smaller than the width of the film on the side opposite to the entrance side, the film is held in the narrow portion between the flanges, and the leading end of the film is delivered from the film entrance to the outside of the patrone body by rotating the spool.

However, since the film-delivery mechanism disclosed in Japanese Patent Laid-Open No. 3-180838 comprises the flanges having outer peripheries which are maintained at a distance smaller than the width of the film, there are the problems that, particularly, when the photographic film is rewound in the film patrone, the flanges cause resistance, and difficulties in rewinding due to the overload on the film, and that the film is sometimes wound around the outer peripheries of the flanges and cannot be exactly wound around the spool.

In the film-delivery mechanism disclosed in Japanese Patent Laid-Open No. 4-143749, since both edges of the film contact the inner surfaces of the flanges in the narrow portion between both flanges, there is the problem that, particularly, when the photographic film is rewound, the flanges cause strong resistance and thus difficulties in precise rewinding due to the overload on the film.

OBJECTS AND SUMMARY OF THE INVENTION

A first object of the present invention is to provide a film patrone with high reliability.

A second object of the present invention is to provide a film patrone with high reliability which enables reliable delivery and rewinding of a film.

A third object of the present invention is to provide a film patrone with high reliability which applies a low load to a film so that the film can be reliably delivered and rewound.

A fourth object of the present invention is to provide a film patrone with high reliability which permits a film to be reliably delivered while being held, and the film to be smoothly rewound with a low load on the film.

A fifth object of the present invention is to provide a small film patrone with high reliability which permits reliable delivery and rewinding of a film.

A sixth object of the present invention is to provide a film patrone comprising a fixed flange and a movable flange both of which reliably engage each other.

In brief, the present invention provides a film patrone comprising a case body having shielding properties, a spool shaft rotatably contained in the case body, a film wound in a roll around the outer periphery of the spool shaft, a fixed flange provided at at least one end of the spool shaft, a movable flange provided so as to be movable relatively to the fixed flange, and cam means provided on at least one of the fixed flange and the movable flange so as to move the movable flange along the direction to thrust the spool shaft when the spool shaft is rotated.

These objects and advantages of the present invention will become further apparent from the following detailed explanation.

DETAILED DESCRIPTION OF THE PREFERRED EMBODIMENTS

Embodiments of the present invention are described below with reference to the drawings.

FIGS. 1 to 4 show a first embodiment of the present invention.

Figure 1:
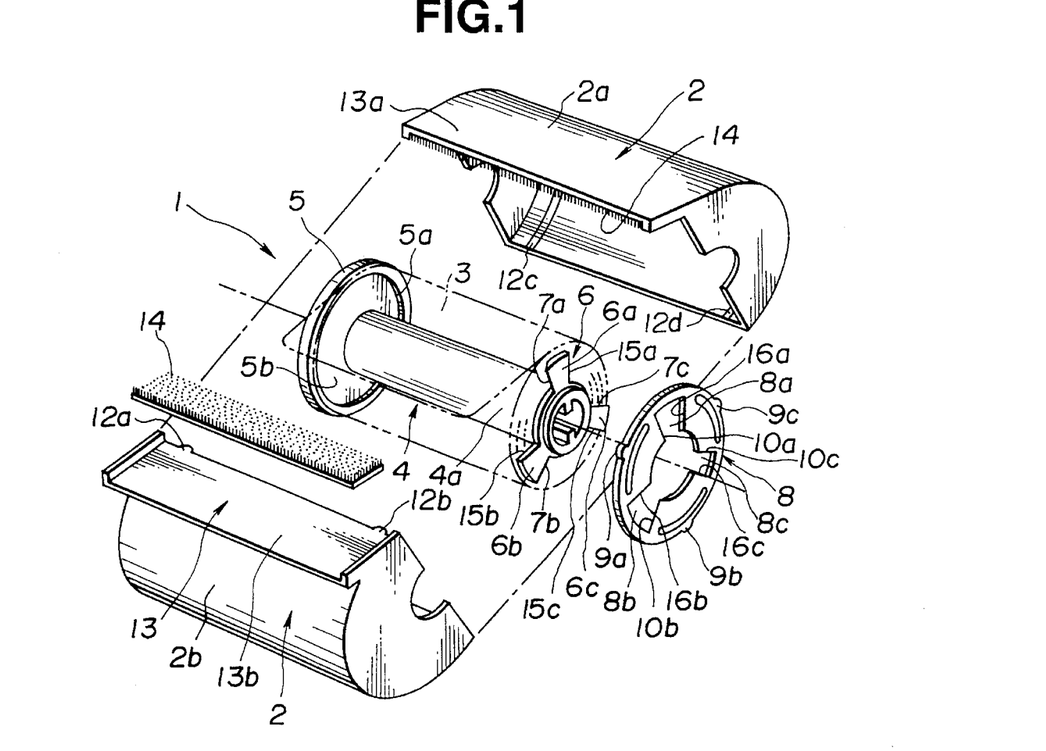
FIG. 1 is an exploded perspective view illustrating a film patrone in accordance with a first embodiment of the present invention.
Figure 2:
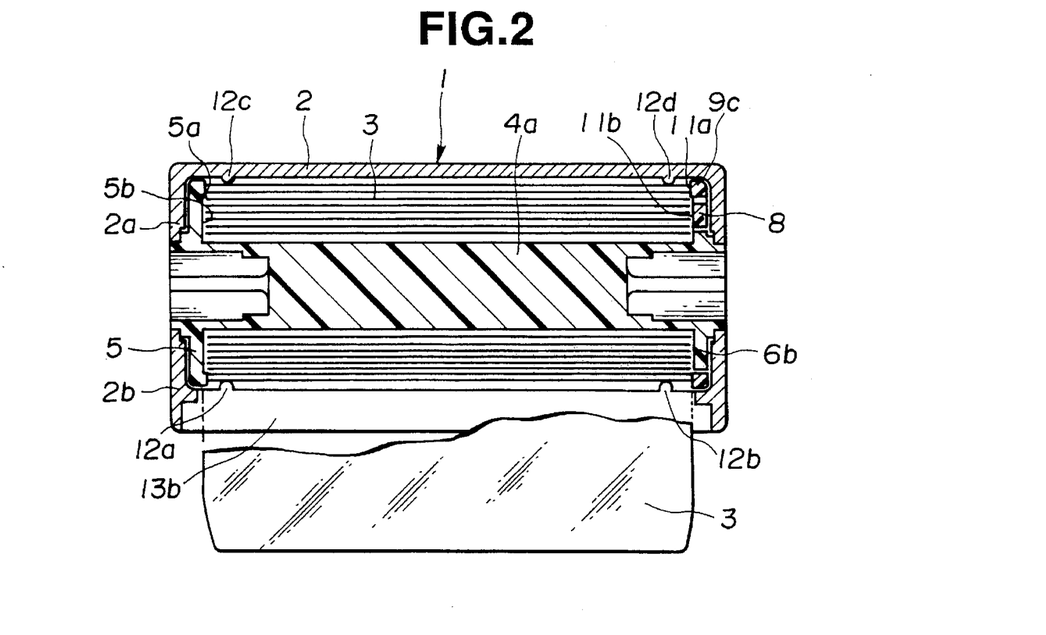
FIG. 2 is an enlarged sectional view illustrating the film patrone of the first embodiment.

As shown in FIGS. 1 and 2, a film patrone 1 of the first embodiment comprises a light-shielding patrone body 2 formed into a cylindrical shape having open ends which are closed by covers; a spool 4 comprising a spool shaft 4a rotatably disposed in the patrone body 2 and comprising a tubular shaft for fixing the leading end of a photographic film 3 and winding the film around the periphery thereof, a disc-shaped flange 5 integrally formed at an end of the spool shaft 4a, and a fixed flange 6 integrally formed at the other end; and a movable flange 8 formed as a unit separate from the spool 4 and disposed corresponding to the fixed flange 6.

The patrone body 2 is formed by joining two patrone body members 2a and 2b which are molded by split dies using a plastic or the like, and has a circular opening formed at the center of each of the closed end covers so that both ends of the spool shaft 4a are exposed therefrom.

The flange 5 has a film pressure portion 5a inwardly projecting from the inner surface 5b along the outer peripheral end thereof so that an outer edge of the film 3 wound on the spool shaft 4a is put into pressure contact with the film pressure portion 5a.

The fixed flange 6 comprises three sector blade cam portions 6a, 6b and 6c which are formed at three positions at equal intervals about the periphery of the spool shaft 4a so as to outwardly project in the radial direction with respect to the axis thereof.

The blade cam portions 6a, 6b and 6c have inclined flange cam portions 7a, 7b and 7c, respectively, which are formed on the side ends thereof on the same side in the film-delivery rotation direction and are inclined at a predetermined angle in the direction to inwardly move the movable flange 8, i.e., in the direction to thrust the spool shaft 4a, and flange engagement portions 15a, 15b and 15c, respectively, which are formed at the other side ends so that the normal to each of the surfaces thereof is vertical to the thrust direction.

On the other hand, the movable flange 8 disposed corresponding to the fixed flange 6 is a disc having the same diameter as that of the flange 5 and has an opening formed therein opposite to the fixed flange 6. Namely, the movable flange 8 has a circular opening formed at the center thereof which is slightly larger than the outer diameter of the spool shaft 4a, and engagement holes 8a, 8b and 8c formed around the circular opening which are slightly larger than the blade cam portions 6a, 6b and 6c, respectively. The movable flange 8 is disposed near the other end of the spool shaft 4 in a state wherein the blade cam portions 6a, 6b and 6c are loosely fitted in the engagement holes 8a, 8b and 8c, respectively.

The movable flange 8 also has passive cam portions 10a, 10b and 10c which are formed on the inner sides thereof opposite to the inclined flange cam portions 7a, 7b and 7c of the blade cam portions 6a, 6b and 6c, respectively, loosely fitted thereto, and which comprise inclined surfaces in contact with the inclined flange cam portions 7a, 7b and 7c, respectively. The movable flange 8 further has spool engagement portions 16a, 16b and 16c which are formed on the other inner sides thereof opposite to the flange engagement portions 15a, 15b and 15c and which comprise vertical surfaces in contact with the flange engagement portions 15a, 15b and 15c, respectively.

When the blade cam portions 6a, 6b and 6c are loosely fitted in the engagement holes 8a, 8b and 8c, respectively, of the movable flange 8, and when the spool 4 is rotated in the direction of contact between the inclined flange cam portions 7a, 7b and 7c and the passive cam portions 10a, 10b and 10c, respectively, i.e., in the direction to deliver the film, therefore, the movable flange 8 is rotated in the same direction, and the passive cam portions 10a, 10b and 10c are pressed by the inclined flange cam portions 7a, 7b and 7c, respectively. As a result, the movable flange 8 is moved in a direction to thrust the film wound around the spool shaft 4a.

In this way, cam means comprising the inclined cam portions 7a, 7b and 7c and cam means comprising the passive cam portions 10a, 10b and 10c are formed on the blade cam portions 6a, 6b and 6c of the fixed flange 6 and the engagement holes 8a, 8b and 8c of the movable flange 8, respectively.

The movable flange 8 also has a film pressure portion 11a (refer to FIG. 2) which is formed on the inner side 11b along the outer periphery thereof so as to inwardly project, as the flange 5. The other outer edge of the film 3 wound around the spool shaft 4a contacts the film pressure portion 11a.

The movable flange 8 further has sliding contact portions 9a, 9b and 9c which are formed at equal intervals about the outer periphery thereof so as to outwardly project. The sliding contact portions 9a, 9b and 9c are provided with elasticity by circular arc shaped slots which are formed at positions corresponding to the sliding contact portions 9a, 9b and 9c in the inner surface of the movable flange 8 so as to contact the inner wall of the patrone body 2 and generate weak frictional force.

The patrone body 2 has a film entrance 13 for delivering and rewinding the photographic film 3, which is formed by film entrance end plates 13a and 13b of the two patrone body members 2a and 2b. To each of the film entrance end plates 13a and 13b is bonded a light shielding member 14 for protecting the inside of the film patrone from light. The shielding member 14 is made of, for example, a teremp cloth or the like, for preventing incidence of outer light.

On the other hand, ring-formed guide ribs 12a, 12b, 12c and 12d are formed integrally with the inner wall of the patrone body 2 at two positions near the opposite edges of the film beyond the exposure region. The guide ribs 12a and 12b are formed on the patrone body member 2b, and the guide ribs 12c and 12d are formed on the patrone body member 2a. The provision of the guide ribs 12a, 12b, 12c and 12d decreases the area of contact of the film 3 contained in the patrone 1 with the inner wall of the patrone 1, and thus permits smooth delivery of the film 3 due to the decrease in frictional resistance. The guide ribs 12a and 12b which are formed on the film entrance end plate 13b also function to separate the leading end of the film 3 wound in a roll around the spool 4 from the roll state.

The operation of the film-delivery mechanism of the film patrone of this embodiment configured as described above is described below.

Figure 3:
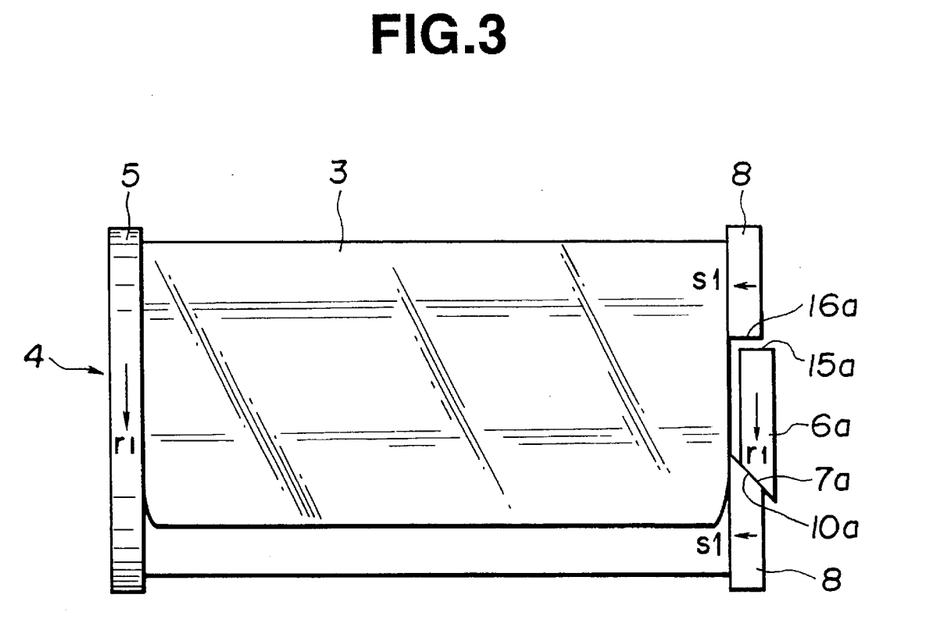
FIG. 3 is a front view illustrating a principal portion of the film patrone of the first embodiment for explaining the operation of a spool and flanges when delivering a film.
Figure 4:
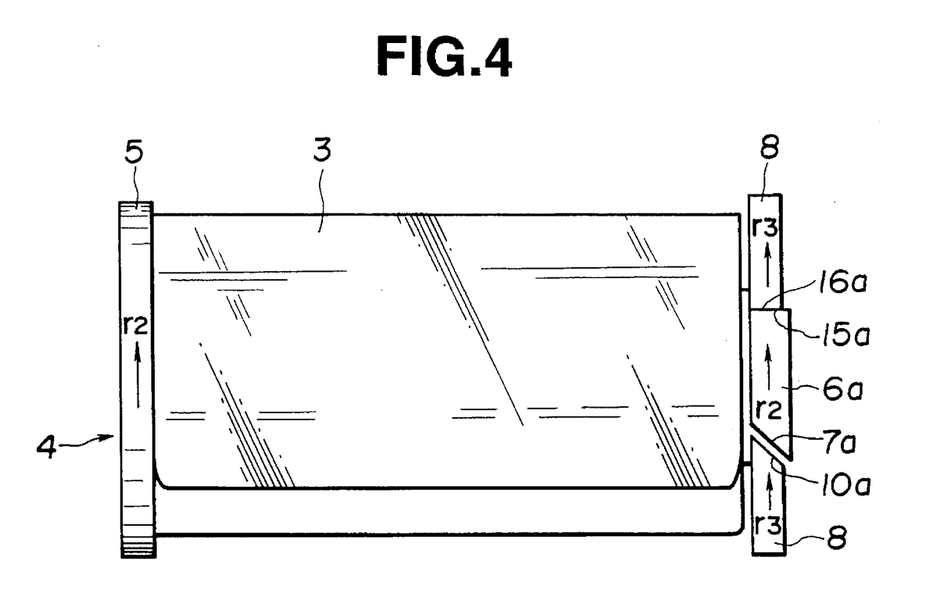
FIG. 4 is a front view illustrating a principal portion of the film patrone of the first embodiment for explaining the operation of the spool and the flanges when rewinding a film.

FIGS. 3 and 4 are drawings illustrating the operations of the spool 4 and the flanges. When the spool 4 is rotated in the film-delivery direction, the flange 5 and the fixed flange 6 which are formed integrally with the spool shaft 4a are started to rotate in the direction shown by an arrow r1. Since the movable flange 8 produces weak friction with the patrone body 2 due to the sliding contact portions 9a, 9b and 9c (refer to FIG. 1), the movable flange 8 is at rest until the inclined flange cam portions 7a, 7b and 7c of the spool 4 contact the passive cam portions 10a, 10b and 10c, respectively, of the movable flange 8.

When the inclined flange cam portions 7a, 7b and 7c make pressure contact with the passive cam portions 10a, 10b and 10c, respectively, by rotation of the spool 4, the movable flange 8 starts to move in the thrust direction shown by an arrow s1. The film 3 is held between the flange 5 and the movable flange 8, and is delivered from the film patrone 1 by rotation of both flanges 5 and 8. In this way, the film 3 is reliably delivered from the patrone body 2 while being held between both flanges 5 and 8.

In this embodiment, the leading end of the film 3 is slightly narrower than the other portion, as shown in FIG. 2, so as to facilitate separation of the film 3 wound around the spool shaft 4a from the roll state, and the guide ribs 12a and 12b separate the film 3 toward the film entrance 13 and facilitate delivery of the film 3 from the film patrone 1.

Although the movable flange 8 has the sliding contact portions 9a, 9b and 9c which are integrally formed and which have the same elasticity to produce weak friction with the patrone body 2, the sliding contact portions 9a, 9b and 9c may comprise separate members having elasticity and be disposed on the outer periphery of the movable flange 8. Alternatively, the sliding contact portions 9a, 9b and 9c may be disposed at positions on the inner wall of the patrone body 2 opposite to the outer periphery of the movable flange 8.

The respective pressure portions 5a and 11a of the flange 5 and the movable flange 8 which hold the film therebetween may be made of a material having large frictional force on the film 3 so that the film can be held more reliably. In addition, although the pressure portions 5a and 11a are formed integrally with the flange 5 and the movable flange 8, respectively, as shown in FIG. 2, only the pressure portions 5a and 11a may be formed as separate members by using a material such as rubber or the like having great frictional force on the film 3, and then bonded to the flange 5 and the movable flange 8, respectively.

Even when the film 3 wound around the spool 4 is slacked by the vibration or impact applied from the outside before the film 3 is delivered from the film patrone 1, since the slack of the film is kept in a predetermined amount by the guide ribs 12a, 12b, 12c and 12d which are formed on the patrone body 2, and since the friction between the film 3 and the guide ribs 12a, 12b, 12c and 12d is small, the film 3 can smoothly be delivered from the film patrone 1.

Although the guide ribs 12a and 12b have the function to prevent a slack of the film 3 wound around the spool 4 and the function to separate the leading end of the film 3 wound around the spool 4 from the roll state, another member such as a separation claw or the like which has the function to separate the leading end of the film 3 may be provided.

Further, a stop claw for preventing inward drop of the movable flange 8 may be provided on the spool 4 so as to restrict the inward movement of the movable flange 8, thereby preventing the movable flange 8 from dropping into the film patrone 1 even if the film is completely drawn out from the film patrone 1.

When the spool 4 is then rotated in the direction to rewind the film 3, the flange 5 and the blade cam portions 6a, 6b and 6c of the fixed flange 6 which are formed integrally with the spool 4 start to rotate in the arrow direction r2 shown in FIG. 4 opposite to the arrow r1 (refer to FIG. 3).

Since the sliding contact portions 9a, 9b and 9c (refer to FIG. 1) of the movable flange 8 produce weak friction with the patrone body 2, the movable flange 8 is at rest until the inclined flange cam portions 7a, 7b and 7c of the spool 4 are separated from the passive cam portions 10a, 10b and 10c, respectively, of the movable flange 8, and the flange engagement portions 15a, 15b and 15c of the spool 4 contact the spool engagement portions 16a, 16b and 16c, respectively, of the movable flange 8.

When the flange engagement portions 15a, 15b and 15c contact the spool engagement portions 16a, 16b and 16c with rotation of the spool 4, the movable flange 8 is rotated with the spool 4 in the same arrow direction r3 as the arrow direction r2. Since each of the flange engagement portions 15a, 15b and 15c and the spool engagement portions 16a, 16b and 16c is not an inclined surface so as not to move in the thrust direction toward the film 3 wound around the spool shaft 4a, the movable flange 8 is not moved in the thrust direction, and is free from the thrust direction, thereby securely rewinding the film 3 into the film patrone without holding the film 3 with a resistance.

Although, in the first embodiment, each of the contact surfaces between the flange engagement portions 15a, 15b and 15c and the spool engagement portions 16a, 16b and 16c, respectively, is not inclined, an inclined cam surface may be provided on the flange engagement portions 15a, 15b and 15c and the spool engagement portions 16a, 16b and 16c so that the movable flange 8 is moved in the direction opposite to the direction to hold the film 3 in rewinding the film 3.

As described above, the first embodiment permits the film contained in the film patrone to be reliably delivered therefrom because the film is held by the movable flange when the film is delivered from the film patrone. When the film is rewound in the film patrone, since holding of the film by the movable flange is released, the rewinding load is decreased, and thus the photographic film can reliably be rewound in the film patrone. The above-described good construction can decrease the diameter of the spool shaft because the spool shaft need not be provided with a special mechanism. A film patrone having high reliability which permits reliable delivery and rewinding of the film can be obtained without an increase in size.

A film patrone according to a second embodiment 1' of the present invention is described below with reference to FIGS. 5 to 9. In the second embodiment, the fixed flange 6' and the movable flange 8' have shapes different from those of the first embodiment. Portions having the same functions as those in the first embodiment are denoted by the same reference numerals, and only different points are mainly described below.

Figure 5:
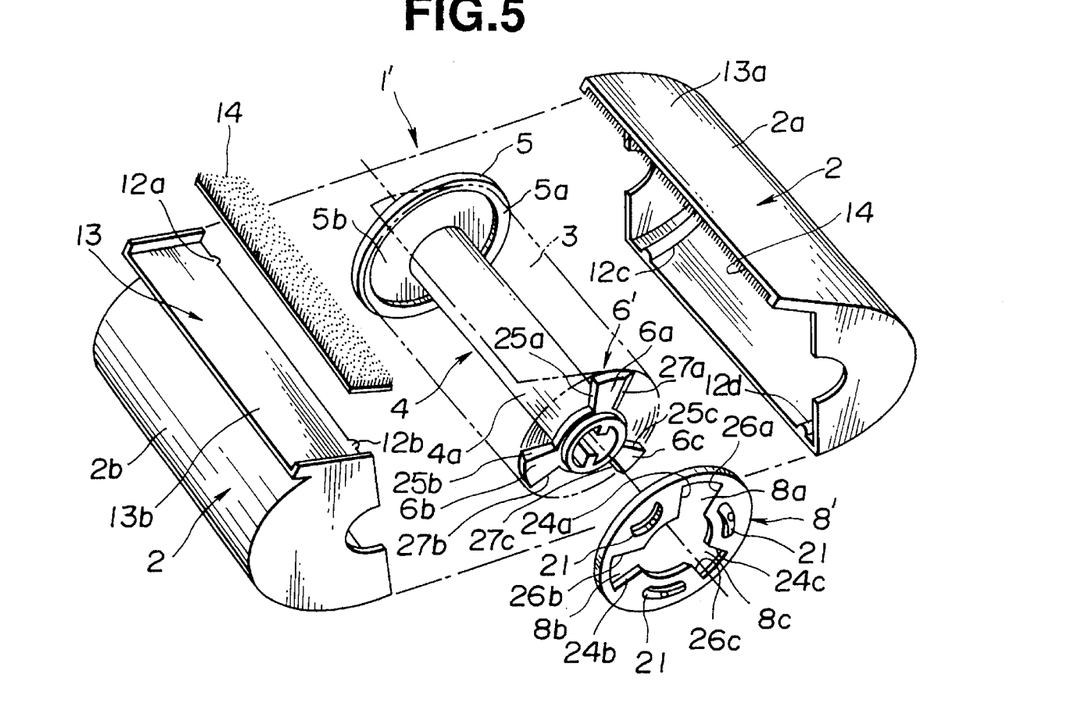
FIG. 5 is an exploded perspective view illustrating a film patrone in accordance with a second embodiment of the present invention.

The fixed flange has inclined flange cam portions 27a, 27b and 27c which are formed at the side ends of the blade cam portions 6a, 6b and 6c thereof, respectively, on the same side in the direction to rewind of the film, and which comprise surfaces inclined at a predetermined angle so as to move the movable flange outwardly in the direction to thrust the spool shaft 4a; and flange engagement portions 25a, 25b and 25c which are formed on the other side ends (i.e., the sides in the rotation direction of film delivery) of the blade cam portions 6a, 6b and 6c, respectively, so that the normal lines are vertical to the thrust direction.

On the other hand, the movable flange 8' has passive cam portions 26a, 26b and 26c which are formed on the inner sides of the engagement holes 8a, 8b and 8c and which comprise inclined surfaces opposite to the inclined flange cam portions 27a, 27b and 27c, respectively, and spool engagement portions 24a, 24b and 24c which comprise vertical surfaces opposite to the flange engagement portions 25a, 25b and 25c, respectively. A stopper surface 26a' comprising a surface which is not inclined is formed at the end of the passive cam portion 26a comprising an inclined surface (refer to FIGS. 7, 8 and 9). Although not shown in the drawings, the same stopper surface is formed on the other passive cam portions 26b and 26c.

Unlike the first embodiment, the inclined flange cam portions 27a, 27b and 27c of the flange 6 and the passive cam portions 26a, 26b and 26c of the movable flange 8' are provided on the sides which engage each other when the film 3 is rewound, as described above.

Similarly, the flange engagement portions 25a, 25b and 25c of the flange 6 and the spool engagement portions 24a, 24b and 24c of the movable flange 8' are provided on the sides which engage each other when the film 3 is delivered.

When the blade cam portions 6a, 6b and 6c are freely fitted in the engagement holes 8a, 8b and 8c, respectively, of the movable flange 8', and when the spool 4 is rotated in the direction of contact between the inclined flange cam portions 27a, 27b and 27c and the passive cam portions 26a, 26b and 26c, i.e., the direction to rewind the film 3, the flange is rotated in the same direction, and the the passive cam portions 26a, 26b and 26c are pressed by the inclined cam portions 27a, 27b and 27c, respectively. As a result, the movable flange 8' is moved in the thrust direction so as to separate from the film 3 wound around the spool shaft 4a.

In this way, cam means comprising the inclined cam portions 27a, 27b and 27c and cam means comprising the passive cam portions 26a, 26b and 26c are formed on the blade cam portions 6a, 6b and 6c of the flange 6' and the engagement holes 8a, 8b and 8c of the movable flange 8', respectively.

Figure 6:
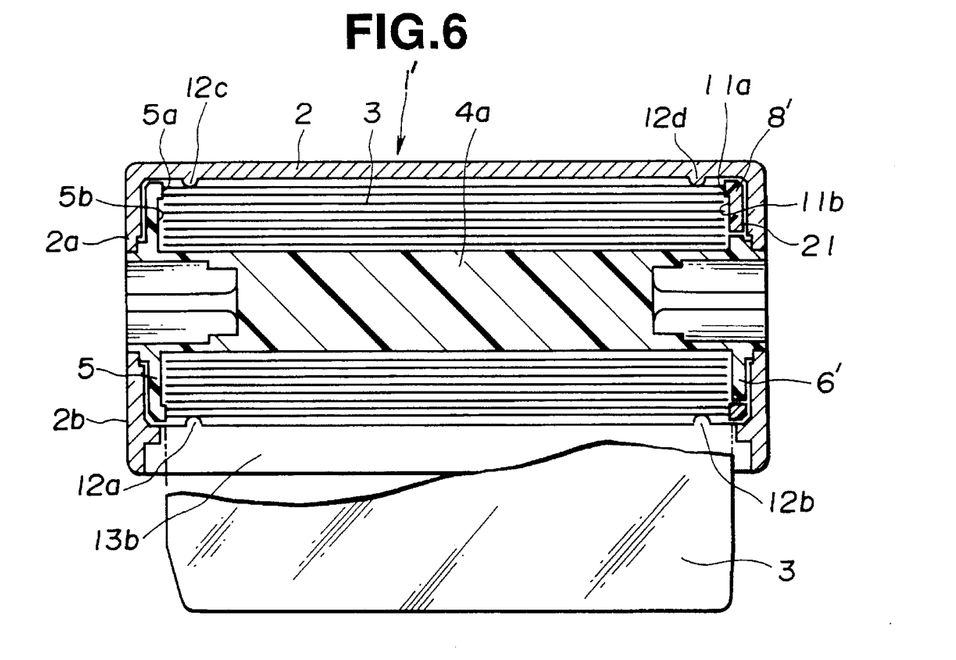
FIG. 6 is an enlarged sectional view illustrating the film patrone of the second embodiment.

The movable flange 8' also has three springs 21 which are provided at three positions at equal intervals along the periphery on the outer side thereof, i.e., on the side opposite to the side of the film 3. When the movable flange 8' is contained in the patrone body 2 in the state where the movable flange 8 is freely fitted to the fixed flange 6', these springs 21 have the function to urge the movable flange 8' in the thrust direction toward the film 3 along the spool shaft 4a by the repulsive force received from the inner surface of the patrone body.

The operation of the film patrone of the second embodiment is described below with reference to FIGS. 7 to 9.

Figure 7:
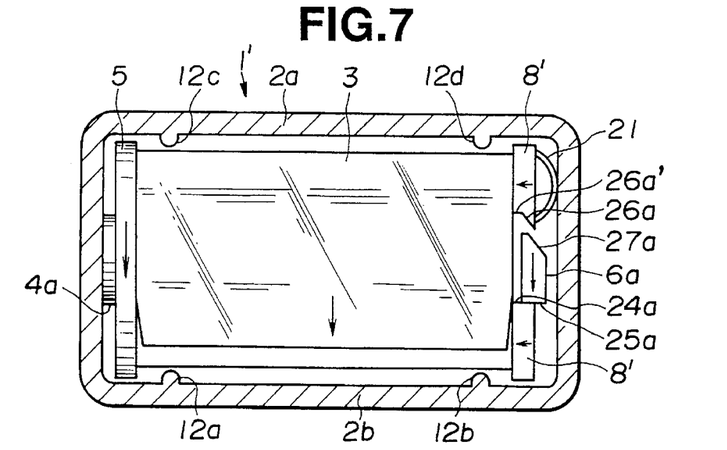
FIG. 7 is a partially sectional front view illustrating a principal portion of the film patrone of the second embodiment for explaining the operation of a spool and flanges when delivering a film.

FIG. 7 shows the state wherein the movable flange 8' is urged in the direction of the spool shaft 4a (the arrow direction shown in the movable flange 8' in FIG. 7) by the springs 21 which receive the repulsive force from the inner surface of the patrone body 2, and the film 3 is held between the movable flange 8' and the flange 5.

In this state, when the spool 4 is rotated in the direction of film delivery (the arrow direction shown in the flange 5 in FIG. 7), the flange 5 and the fixed flange 6' (refer to FIG. 5) are synchronously rotated, and the flange engagement portions 25a, 25b and 25c of the flange 6' then contact with the spool engagement portions 24a, 24b and 24c, respectively, of the movable flange 8'. The movable flange 8' thus receives the rotational force of the blade cam portions 6a, 6b and 6c and starts to rotate with the rotation of the spool 4 in the same direction while holding the film 3 between the movable flange 8' and the flange 5. The film 3 is consequently delivered through the film entrance 13 (refer to FIG. 5) while being held between the flange 5 and the movable flange 8'.

Figure 8:
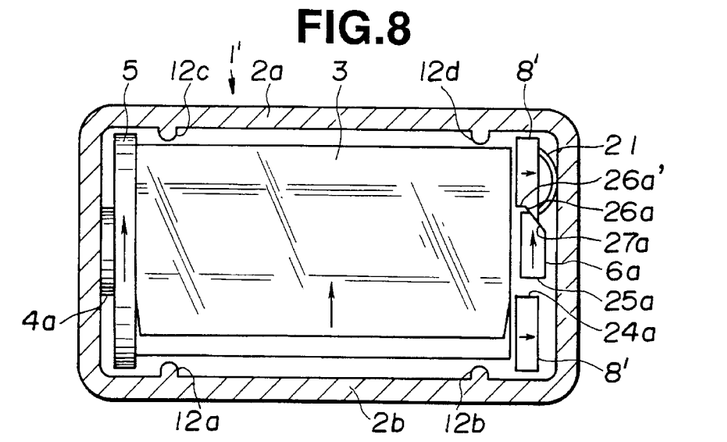
FIG. 8 is a partially sectional front view illustrating the principal portion of the film patrone of the second embodiment for explaining the operation of the spool and the flanges at the start of rewinding of the film.

When the film 3 is rewound in the patrone body 2 after completion or in the course of photographing, as shown in FIG. 8, the spool 4 is rotated in the direction to rewind the film (the arrow direction shown in the flange 5 in FIG. 8). The flange 5 and the fixed flange 6' (refer to FIG. 5) are synchronously rotated, and the inclined cam portions 27a, 27b and 27c of the blade cam portions 6a, 6b and 6c then contact the passive cam portions 26a, 26b and 26c, respectively, of the movable flange 8'. When the spool 4 is further rotated in the direction to rewind the film, the blade cam portions 6a, 6b and 6c is rotated while the inclined cam portions 27a, 27b and 27c thereof sliding along the passive cam portions 26a, 26b and 26c of the movable flange 8'.

The movable flange 8' is pressed by the inclined cam portions 27a, 27b and 27c of the blade cam portions 6a, 6b and 6c with the rotation of the blade cam portions 6a, 6b and 6c, and starts to move in the direction (the arrow direction shown in the movable flange 8' in FIG. 8) away from the flange 5 and the film 3 against the urging force of the springs 21.

Figure 9:
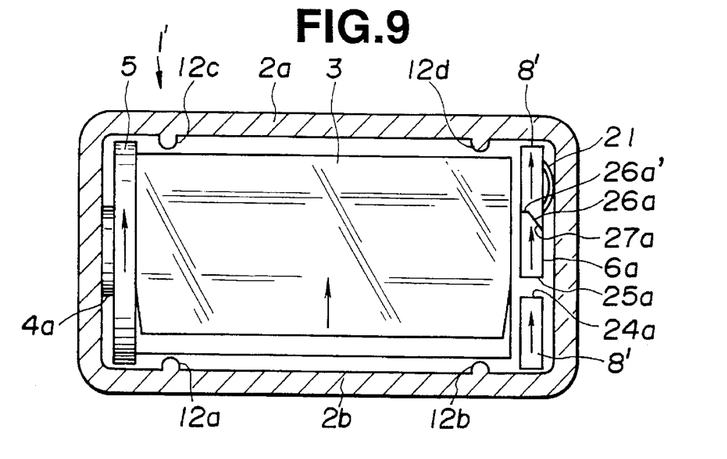
FIG. 9 is a partially sectional front view illustrating a principal portion of the film patrone of the second embodiment for explaining the operation of the spool and the flanges when rewinding the film.

The sliding state between the inclined cam portions 27a, 27b and 27c of the blade cam portions 6a, 6b and 6c and the inclined surface 27b of the movable flange 8' is stopped by the stopper surface 26a' formed continuously from the passive cam portions 26a, 26b and 26c of the movable flange 8', as shown in FIG. 9. In this state, the blade cam portions 6a, 6b and 6c completely engage the movable flange 8'.

In this state, the movable flange 8' is rotated in the direction to rewind the film with the rotation of the blade cam portions 6a, 6b and 6c while the movable flange 8' is maintained at a position separate from the flange 5 and the film 3 by the blade cam portions 6a, 6b and 6c. As a result, the film 3 is rewound in the film patrone 1' through the film entrance 13.

When the film 3 is completely rewound, and the spool 4 is made free, the movable flange 8' releases the engagement with the fixed flange 6' by receiving the urging force of the springs 21 and starts to hold the film between the movable flange 8' and the flange 5. As a result, the film 3 rewound is stably and reliably contained in the film patrone without slacking.

The film patrone of the second embodiment comprises the movable flange 8' designed so as to be slidably fitted on the fixed flange 6' and hold the film 3 between the movable flange 8' and the flange 5 by the urging force of the fixed flange 6'. When the film is delivered, the film 3 is thus urged by the movable flange 8' so that the film 3 can stably and reliably be delivered while being held between the movable flange 8' and the flange 5. When the film 3 is rewound, the movable flange 8' is separated from the flange 5 and the film 3 so that the distance between both flanges 8' and 5 is increased, thereby smoothly rewinding the film 3. As a result, a film patrone which permits smooth and reliable delivery and rewinding of the film with a low load can be obtained.

Since the film 3 is also urged by the movable flange 8' at a time other than the time of rewinding, the film is constantly held between the movable flange 8' and the flange 5. For example, when the film patrone 1' is carried, it is thus possible to prevent a slack of the wound film 3.

The second embodiment is not limited to the above construction, and various changes can be made.

For example, it is preferable to bond a separate member formed by integrally molding a material having a high coefficient of friction, such as rubber or the like, to the film pressure portion 5a of the flange 5 and the film pressure portion 11a of the movable flange 8'. This construction can decrease the force of the springs 21 needed to urge the movable flange 8', and consequently decrease the load on the rotation of the spool 4.

It is also preferable that the leading end of the film 3 is tapered to be narrower than the other portion thereof so that the film can easily be separated from the roll state, as in the first embodiment. This construction permits the leading end of the film 3 to be reliably separated from the other portion thereof wound in a roll by a pair of guide ribs 12a and 12b provided on the patrone body member 2b. It is also preferable to provide a separate member, for example, a claw member, for separating the leading end of the film 3.

It is further preferable to provide a member, e.g., a claw member, for preventing dropping of the movable flange 8' on the spool 4 so as to restrict the movement of the movable flange 8' in the direction of the spool 4. This arrangement can prevent the movable flange 8' from dropping on the spool 4 even when the film 3 is entirely delivered from the patrone 1'.

In this invention, it is apparent that working modes different in a wide range can be formed on this basis of this invention without departing from the spirit and scope of the invention. This invention is not restricted by any specific embodiment except as is limited by the appended claims.

What is claimed is:

1. A film cartridge comprising:
   (a) a case body;
   (b) a spool shaft rotatably contained in said case body;
   (c) a film wound in a roll around an outer periphery of said spool shaft;
   (d) first and second fixed flanges arranged at respective opposite ends of the spool shaft, one of said fixed flanges being comprised of a plurality of angularly spaced sectors and projecting in an outward radial direction from said spool shaft;
   (e) a movable flange provided at at least one end of said spool shaft, said movable flange being rotatable relative to said spool shaft in a region between the respective sectors; and
   (f) an edge of one of said sectors and an edge of said movable flange being in engagement when said spool is rotated an amount sufficient to feed film from the cartridge;
   (g) cam means provided on at least one of said edges for causing said movable flange to move in a direction to engage said film wound around said spool shaft during sliding engagement of said edges when said spool shaft is rotated in a direction to deliver said film from said case body.

2. A film cartridge according to claim 1, wherein the edges of one of the sectors and the movable flange are radially aligned and said cam means comprises an inclined surface provided at a radially aligned edge of at least one of said sectors and a radially aligned edge of said movable flange.

3. A film cartridge according to claim 1, wherein said cam means is formed on each of said edges of said sectors.

4. A film cartridge according to claim 1, wherein said movable flange has an outer circumferential portion which makes frictional contact with said case body to assure sliding engagement between said fixed and moving flanges when the spool is rotated to feed film out of the case body.

5. A film cartridge according to claim 1 wherein said movable flange has openings each for receiving one of said sectors, each opening being of a size greater than a size of a sector to enable some rotation of the movable flange relative to the spool shaft.

6. The film cartridge of claim 5 wherein said movable flange is disk-shaped.

7. The film cartridge of claim 5 wherein one of a radial portion of an opening of said moveable flange and a radial portion of a sector are provided with said cam means.

8. The film cartridge of claim 7 wherein said cam means comprises a surface on a radial portion which is diagonally aligned relative to an axis of said spool shaft.

9. A film cartridge comprising:
   (a) a case body;
   (b) a spool shaft rotatably contained in said case body;
   (c) a film wound in a roll around said spool shaft;
   (d) a pair of fixed flanges integrally provided on a periphery of said spool shaft at respective opposite ends thereof;
   (e) a movable flange provided adjacent to one of said fixed flanges and being rotatable relative to said spool shaft; and
   (f) said one of said fixed flanges and said movable flange having edges in sliding engagement when said spool shaft is rotated by an amount sufficient to feed film out of the cartridge;
   (g) cam means provided on at least one of said edges for moving said movable flange in a direction to engage said film wound around said spool shaft as said edges are in sliding engagement when said spool shaft is rotated in a direction to deliver said film from said case body.

10. A film cartridge according to claim 9, wherein said movable flange has an outer circumferential portion which makes frictional contact with an interior surface of said case body to restrain rotation of said movable flange.

11. A film cartridge according to claim 9, wherein said cam means is formed along a radially aligned edge of said fixed flange.

12. A film cartridge in which a film wound around a spool shaft contained therein is delivered from a delivery port by rotation of said spool shaft; said film cartridge comprising:
   (a) a pair of flanges joined at respective opposite ends to said spool shaft and being separated by a distance equal to or greater than a width of said film, a first flange cam being provided on at least one of said flanges;
   (b) a movable flange axially movable and rotatable relative to said spool shaft and having a second flange cam for engaging said first flange cam; and
   (c) frictional means provided between said movable flange and an internal surface of said cartridge to restrain rotation of said movable flange;
   wherein, when said spool shaft is rotated a given amount in a film delivery direction, said movable flange is moved toward said film wound on said spool shaft by operation of said frictional means and engagement between said first and second flange cams.

13. A film cartridge according to claim 12, wherein said frictional means includes elastic means for pressing said moveable flange against said cartridge body.

14. A film cartridge comprising:
   (a) a cartridge shell;
   (b) a photographic film;
   (c) a spool shaft contained in said cartridge shell, and being rotatably supported therein, and having a first flange fixed at one end of said spool shaft and a second plate-shaped flange provided at another end thereof so as to project radially outward from said spool shaft, a cam surface being formed in a radially aligned portion of said second plate-shaped flange, said photographic film being wound about said spool shaft and between said first and second flanges;
   (d) a third movable plate-shaped flange for engaging said second flange and said spool shaft, and being axially movable relative to said spool shaft and rotatable within a predetermined range relative to said spool shaft, and having a cam surface formed at a side end thereof to engage said cam surface of said second flange; and (e) frictional means provided between said movable flange and an interior of said cartridge shell to ensure contact between said two cams by restraining rotation of said movable flange;

wherein when said spool shaft is rotated in a direction to deliver said film from said cartridge shell, said movable flange is moved toward said film wound about said spool shaft by engagement between the cam surface of said movable flange and the cam surface of said second flange to deliver said film from said cartridge shell while holding said film by rotation together with said spool shaft, and when said spool shaft is rotated in a direction opposite said direction to deliver, engagement between said two cam surfaces is released to wind said film around said spool shaft.

15. A film cartridge according to claim 14, wherein said frictional means includes elastic means for urging said third flange against said interior of said cartridge shell.

16. A film cartridge according to claim 14, wherein said frictional means is provided between an inner periphery of said cartridge shell and an outer periphery of said movable flange to restrain rotation of said movable flange.

17. A film cartridge comprising:

(a) a cartridge shell;

(b) a photographic film;

(c) a spool shaft rotatably supported in said cartridge shell, and having a first flange fixed at one end of said spool shaft and a second plate-shaped flange provided at another end thereof so as to project radially outward from said spool shaft, said photographic film being wound about said spool shaft and between said first and second flanges;

(d) a third movable plate-shaped flange for engaging said second flange and said spool shaft, and being axially movable relative to said spool shaft and rotatable within a predetermined range relative to said spool shaft, and having a side end cam surface for engaging a cam surface on said second flange when said spool shaft is rotated by a given amount; and (e) frictional means provided between said movable flange and an interior surface of said cartridge shell to ensure contact between the cam surfaces of said second and third flanges by restraining rotation of said movable flange;

wherein when said spool shaft is rotated in a first direction to deliver said film from said cartridge shell, said movable flange is moved toward said film wound about said spool shaft by engagement between the cam surfaces of said third movable flange and said second flange to deliver said film from said cartridge shell by holding opposing edges of said film during rotation of said spool shaft, and when said spool shaft is rotated in a second direction opposite said first direction, the engagement of said cam surfaces is released to release the opposite edges of the film when winding said film around said spool shaft.

18. The film cartridge of claim 17 wherein said frictional means comprises projections about a periphery of said movable flange for engaging said shell interior surface.

19. The film cartridge of claim 18 wherein said movable flange is provided with slots arranged adjacent to said projections to provide elasticity of said movable flange in regions of each projection.

20. A film cartridge comprising:

(a) a cartridge case having an entrance opening for a film;

(b) a spool shaft rotatably mounted in said case and having first and second fixed flanges, a cam being formed on said second fixed flange;

(c) a third movable flange rotatable and axially movable relative to said spool shaft and having an edge disposed at a position adjacent to the cam formed on said second flange, said movable flange being slidable along an interior of said cartridge case; and (d) a film wound around said spool shaft;

wherein, when said spool shaft is rotated by an amount sufficient to feed film and in a direction to deliver said film, side edges of said film wound on said spool shaft are held between said first and third flanges due to sliding engagement between said cam and the edge of said movable flange to move the third flange toward the first flange, and when said spool shaft is rotated in an opposite direction to rewind said film, said film is not held between said first and third flanges.

21. A film cartridge according to claim 20, wherein a member is provided on at least a portion of the surface of at least one of said first flange and said third flange for increasing friction between said film and said first and third flanges.

22. A film cartridge according to claim 21, wherein said member for increasing friction is bonded to one of said first and third flanges.

23. A film cartridge according to claim 21, wherein said member for increasing friction is formed integrally with one of said first and third flanges.

24. A film cartridge according to claim 20, wherein elastic means is interposed between sliding portions of said movable flange and said cartridge case for restraining rotation of said movable flange.

25. A film cartridge according to claim 20, wherein elastic means is integrally provided on said third flange or said film cartridge for restraining rotation of said movable flange.

\* \* \* \* \*